United States Patent [19]

Leung

[11] Patent Number: 5,794,468

[45] Date of Patent: Aug. 18, 1998

[54] ANTI-THEFT STEERING WHEEL ASSEMBLY

[76] Inventor: Patrick Wai-Chung Leung, 1535 Ostler Court, North Vancouver, British Columbia, Canada, V7G 2P1

[21] Appl. No.: 672,088

[22] Filed: Jun. 27, 1996

[51] Int. Cl.$^6$ .................................................. B60R 25/02
[52] U.S. Cl. ........................ 70/209; 70/205; 70/224; 74/552
[58] Field of Search .................... 70/188, 189, 209, 70/205, DIG. 31, 204, 207, 472, 221–223, 215–218, 224, 422; 74/552; 180/287

[56] References Cited

U.S. PATENT DOCUMENTS

| | | | |
|---|---|---|---|
| 1,341,032 | 5/1920 | Appleby | 70/209 |
| 1,403,660 | 1/1922 | Weaver | 70/209 |
| 1,442,120 | 1/1923 | Brasket | 70/209 |
| 1,449,563 | 3/1923 | Vincent | 70/209 |
| 1,457,733 | 6/1923 | Frederickson | 70/212 |
| 1,476,742 | 12/1923 | Vincent | 70/209 |
| 1,496,501 | 6/1924 | Vincent | 70/209 |
| 1,496,861 | 6/1924 | Murphey | 70/209 |
| 1,545,729 | 7/1925 | Beck . | |
| 1,594,574 | 8/1926 | Stanley et al. | 70/209 |
| 1,596,230 | 8/1926 | Benford | 70/209 |
| 1,610,735 | 12/1926 | Bilgere | 70/209 |
| 4,934,479 | 6/1990 | Usina | 180/287 |
| 5,172,607 | 12/1992 | Wu | 74/552 |
| 5,442,942 | 8/1995 | Geisler | 70/209 |

FOREIGN PATENT DOCUMENTS

| | | | |
|---|---|---|---|
| 628979 | 11/1927 | France | 70/209 |
| 288494 | 4/1928 | United Kingdom | 70/221 |

Primary Examiner—Lloyd A. Gall
Attorney, Agent, or Firm—Shlesinger, Arkwright & Garvey LLP

[57] ABSTRACT

A steering wheel assembly for a vehicle includes a steering wheel hub, a rim, the rim being pivotally connected with the hub for rotation of the rim relative to the hub about an axis of rotation disposed inwardly from the rim. The rim is rotatable about the axis between a first position permitting normal steerage of the vehicle and a second position impairing normal steerage of the vehicle. The rim may be engaged and locked in the second position at a point of engagement at or the perimeter of the rim. Futher, the rim may be releasably held in the first position.

14 Claims, 3 Drawing Sheets

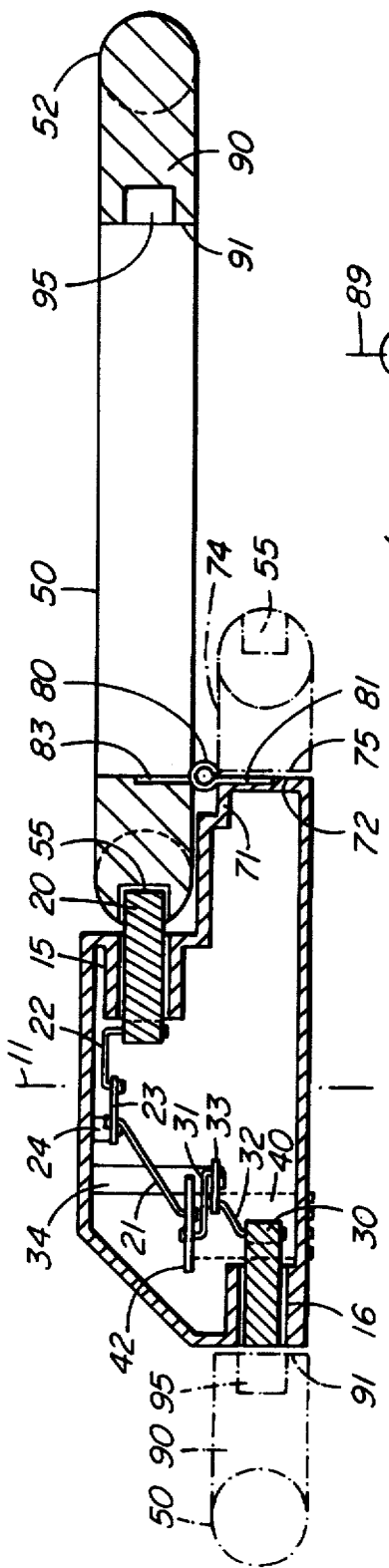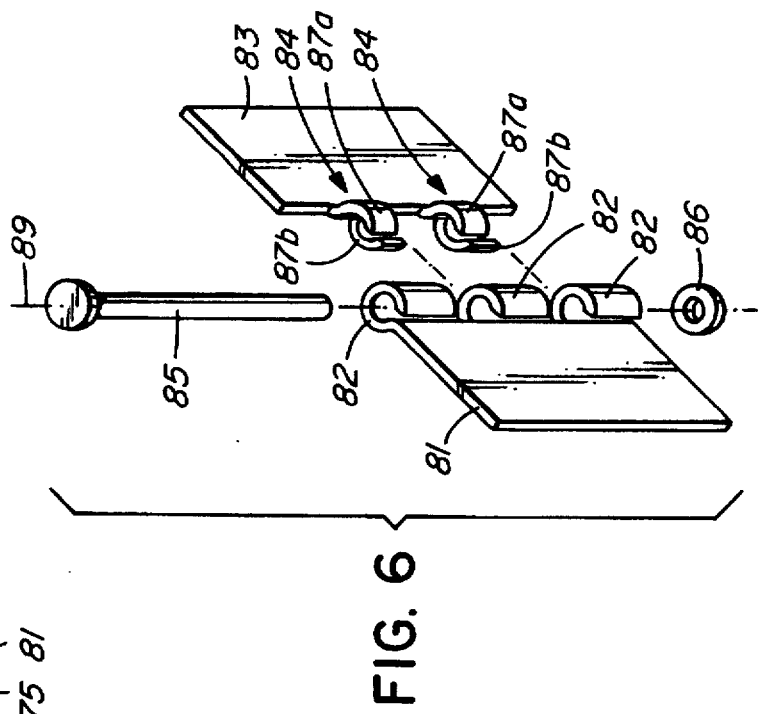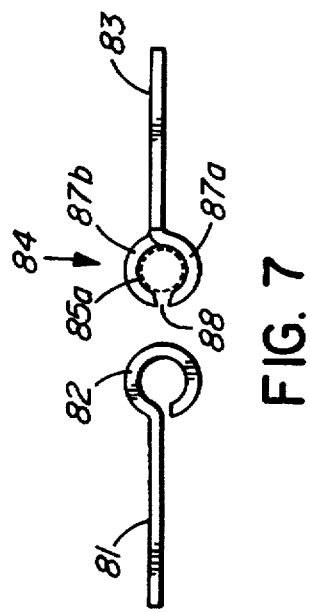

ANTI-THEFT STEERING WHEEL ASSEMBLY

FIELD OF THE INVENTION

The present invention relates to steering wheels for automobiles, trucks and other vehicles. More particularly, the present invention relates to vehicle steering wheel assemblies which include features to discourage vehicle theft.

BACKGROUND TO THE INVENTION

Over the years, various steering wheel mechanisms have been devised to discourage and limit the theft of vehicles. These range from mechanisms which contemplate the complete removal of the steering wheel when a vehicle is not in use to mechanisms which disengage the wheel from the steering column (thereby allowing the wheel to spin freely) when the vehicle is not in use. As well, they include mechanisms which effectively lock the steering wheel or steering column.

With the exception of cases where the steering wheel is completely removed, all of the foregoing mechanisms fail to provide any visible message to a potential thief that the vehicle is disabled. Even though the protection mechanism may be engaged, steering will appear to be intact. Only after breaking and entering the vehicle, with potential damage to windows or doors, may the thief discover that this is not so.

If the steering wheel is completely removed, then there will be a strong deterrent message to a potential thief However, the need to take the time to remove and safely store the wheel each time the vehicle is parked, and then to reverse the procedure when ready to travel, is a tremendous nuisance and unacceptable to most drivers.

More recently, an anti-theft steering wheel mechanism has been devised which not only serves to impair steerage but also to provide a visible message that the steerage has been impaired. In particular, U.S. Pat. No. 5,442,942 granted to Geisler on Aug. 22, 1995, discloses a steering wheel assembly where an upper portion of the steering wheel rim is rotatably mounted on a fixed lower portion of the steering wheel rim. In normal use, the upper and lower portions engage to form a conventional steering wheel. However, when the vehicle is parked, the driver can impair steerage by rotating one end of the upper portion away from its normal connection with the lower portion to an open or abnormal position, the other end of the upper portion being pivotally connected with the lower portion to permit such rotation. The mechanism includes a means for locking the upper portion in the open position. In the open position, the protruding upper portion will serve to impair vehicle steering—and potential thieves will see through the vehicle windows that it is impaired. However, the deterrent effect is limited.

The deterrent effect with the mechanism disclosed in the patent to Geisler is limited because the pivotal connection between the upper and lower portions of the steering wheel rim may appear rather flimsy to a determined thief This appearance may be correct or incorrect, but in either case it may be insufficient to prevent a break and entry because it will also appear, in this case correctly, that if the connection is broken then the remaining lower portion of the rim will permit the vehicle to be steered without difficulty.

A primary object of the present invention is to provide a new and improved steering wheel assembly to discourage break and entry into vehicles for the purpose of vehicle theft.

A further object of the present invention is to provide a new and improved steering wheel assembly which serves to impair vehicle steerage if unauthorized access is gained.

A still further object of the present invention is to provide a new and improved steering wheel assembly for a vehicle which may be used not only to disable vehicle steerage and to provide a visible message to potential thieves that steerage has been disabled, but also a visible message that steerage will remain impaired if the disabling mechanism is broken.

SUMMARY OF THE INVENTION

In accordance with a broad aspect of the present invention, there is provided a steering wheel assembly for a vehicle, the assembly including a hub, a rim having a perimeter and means for pivotally connecting the rim with the hub for rotation of the rim relative to the hub about an axis of rotation disposed inwardly from the rim. The rim is rotatable about the axis between a first position permitting normal steerage of the vehicle and a second position impairing normal steerage of the vehicle. A locking means is provided for releasably engaging and locking the rim in the second position at a point of engagement at or near said perimeter.

In a preferred embodiment of the present invention, the connecting means comprises a spoke having a first portion extending from an inner end connected to the hub to an outer end, a second portion extending from an outer end connected to the rim to an inner end, and a hinge pivotally interconnecting the inner end of the second portion with the outer end of the first portion. The hinge axis corresponds to the specified axis of rotation of the rim about the hub. In one embodiment, the hinge may be advantageously designed as a weak link in the steering wheel assembly.

With the foregoing structure, the steering wheel assembly may include means for disabling rotation about the specified axis. Such disabling means may comprise a holding means operable when the rim is in its first position for releasably holding the rim inthe first position. Preferably, the holding means serves not merely to hold but also to lock the rim in the first position. In a preferred embodiment, the locking means comprises a locking member carried by the hub and means for moving the locking member between a retracted position substantially within the hub and an extended position lockably engaging the rim when the rim is in its second position. The holding means may comprise a similar locking member moveable between corresponding retracted and extended positions and, advantageously the movements of both locking members are simultaneously controlled by a single operating mechanism.

With the axis of rotation disposed inwardly from the steering wheel rim, it will be appreciated that the entire rim will rotate away from the first or normal steerage position when rotation occurs. When the rim has been rotated to the second position, steering will be visibly impaired. Moreover, it will be visibly apparent that if the rim is broken away from the second position, then there will be no rim left with which to steer. This is unlike the design disclose in the patent to Geisler where a usable portion of the steering wheel rim would remain in its proper steering position if the remaining portion was broken away.

The foregoing and other features and advantages of the present invention will now be described with reference to the drawings.

BRIEF DESCRIPTION OF THE DRAWINGS

FIG. 5 is a horizontal section view showing first and second rim positions as in FIG. 4.

FIG. 6 is an exploded isometric view of a hinge forming part of the assembly shown in FIG. 1.

FIG. 7 is a top view of the leaves of the hinge shown in FIG. 6.

DETAILED DESCRIPTION

Figure 1:
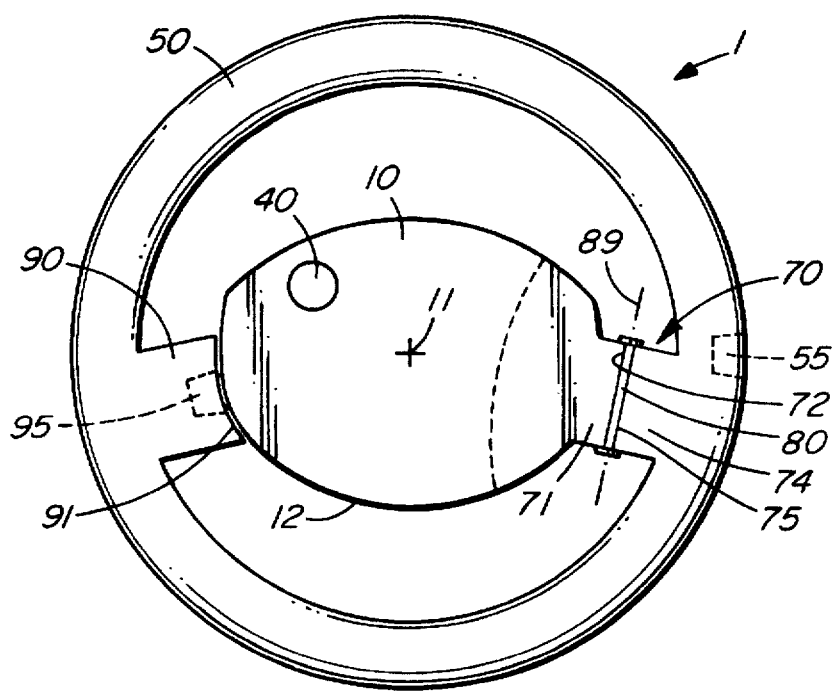
FIG. 1 is a front elevation view of an anti-theft steering wheel assembly for a vehicle in accordance with the present invention, the rim of the wheel being in a position permitting normal steerage of the vehicle.
Figure 2:
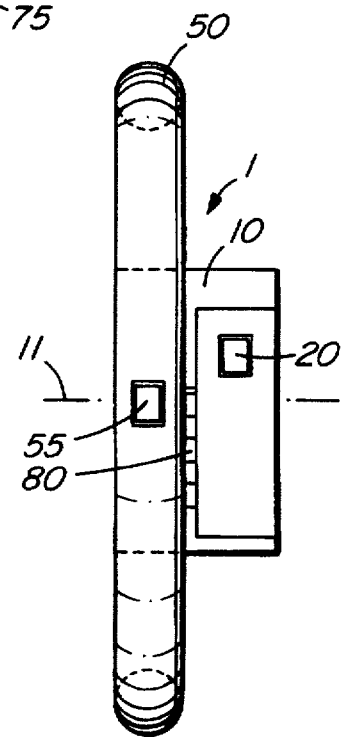
FIG. 2 is a side elevation view of the steering wheel shown in FIG. 1.
Figure 3:
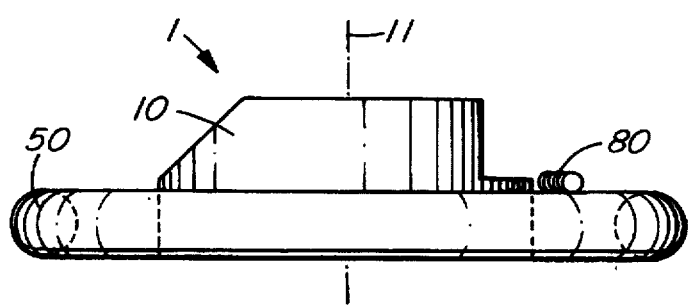
FIG. 3 is a top elevation view of the steering wheel shown in FIG. 1.

The anti-theft steering wheel assembly shown in the drawings (and generally designated 1) comprises a centrally disposed hub 10, a rim 50, and a pair of spokes 70, 90. The steering shaft (not shown) of a vehicle connects to hub 10 along hub axis 11 where it is engaged by teeth 19 (see FIG. 4) of the hub and is secured in a conventional manner by a steering shaft nut (also not shown).

Although the outward appearance of steering wheel assembly 1 is similar to that which can be seen in any number of automobiles, small vans, pickup trucks and the like, it is to be understood that the use of the present invention is not limited to such vehicles. It may be adapted to a wide range of vehicles which utilize steering wheels for their operation. This includes not only other types of road vehicles such as large trucks, buses and the like, but also non-road vehicles such as some boats and some aircraft.

Referring now to the present embodiment, spoke 70 includes a first portion 71 which extends from an inner end in merged connection with hub 10 to an outer end 72, and a second portion 74 which extends from an outer end in merged connection with rim 50 to an inner end 75. A hinge 80 pivotally interconnects inner end 75 of spoke portion 74 with outer end 72 of spoke portion 71. Spoke 90 includes an outer end in merged connection with rim 50 and extends inwardly to an inner end 91. As can be seen in FIG. 1, inner end extends to a position very near perimeter 12 of hub 10 when wheel 1 is in its normal steerage position. As well, it has a shape which closely matches the opposing contour of perimeter 12.

Spoke 70 and hinge 80 serve as a means for pivotally connecting rim 50 with hub 10 for rotation of the rim relative to the hub about an axis of rotation 89 (which is one and the same as the hinge axis of hinge 80). Such rotation may occur between a first position permitting normal steerage of the vehicle (viz. the position shown in FIG. 1 and, in broken outline, the position shown in FIG. 4), and a second position impairing normal steerage of the vehicle (viz. the position shown in solid outline in FIG. 4).

Figure 4:
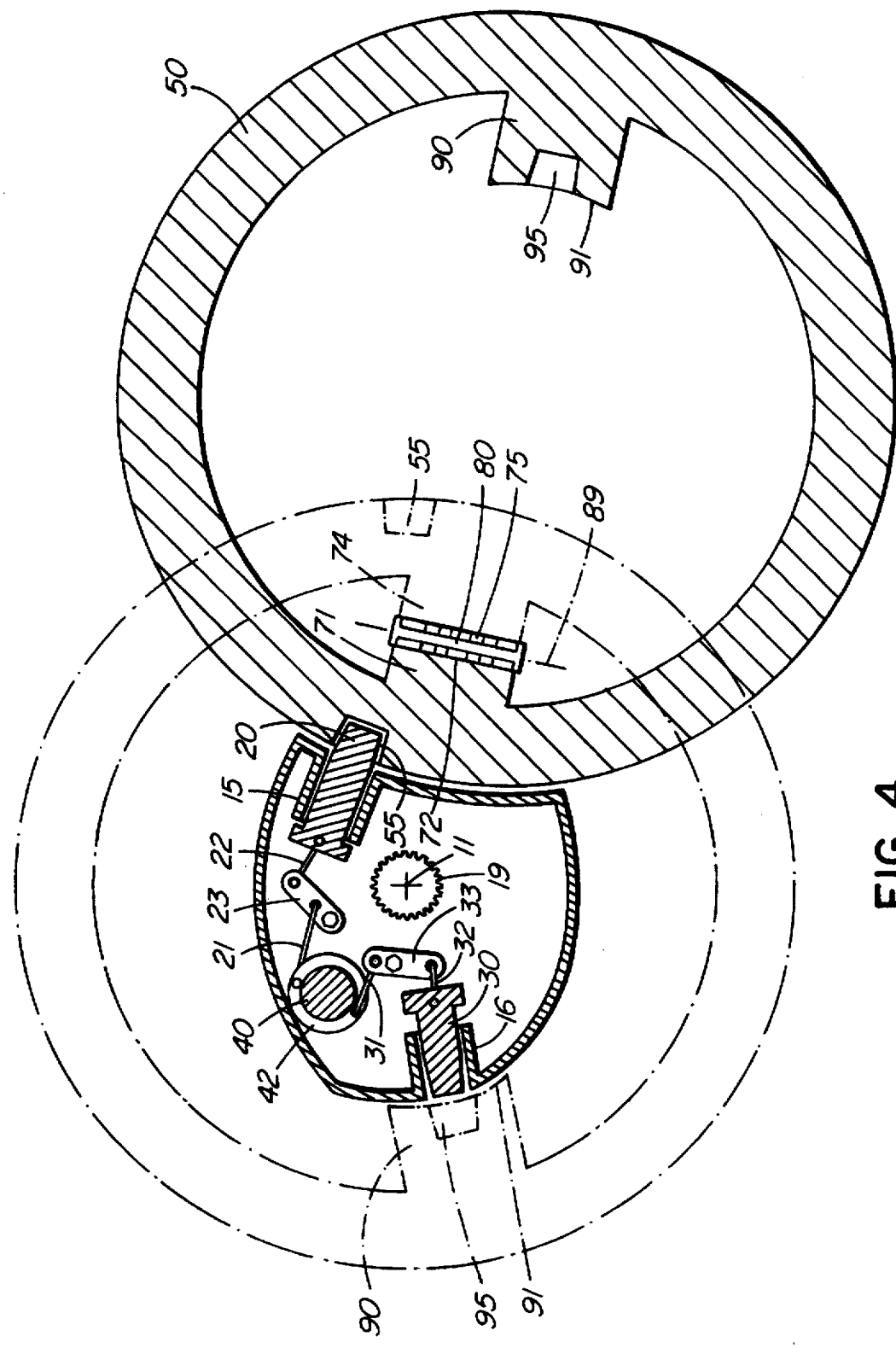
FIG. 4 is a partially sectioned front elevation view showing the rim of the wheel of FIG. 1 in a first position (broken outline) permitting normal steerage and in a second position (solid outline) impairing normal steerage.

Hereinafter, the first position is referred to as the "normal steering position" and the second position is referred to as the "steering impaired position". In the normal steering position, steering occurs in the usual manner upon rotation of the steering wheel about hub axis 11. However, in the steering impaired position, it will be evident that normal steering will be impaired because protruding rim 50 as shown in FIG. 4 will abut or collide with interior portions of the vehicle (not shown) upon only limited rotation about hub axis 11.

Rim 50 includes a socket or recess 55 in its outer periphery which is sized to slidingly receive a locking member or bolt 20 carried by hub 50. Similarly, spoke 90 includes a recess 95 at its inner end 91 which is sized to slidingly receive a holding member or bolt 30 also carried by hub 10. Bolt 20 is part of a locking means operable when rim 50 is in the steering impaired position for releasably locking rim 50 in the impaired position. Likewise, bolt 30 is part of a holding means operable when rim 50 is in the normal steering position for releasably holding rim 50 in the normal steering position.

For the embodiment shown, it will be noted that bolt 30 may be described not only as part of a holding means for releasably holding rim 50 in the normal steering position, but equally as part of a locking means for releasably locking rim 50 in the normal steering position. While in general it is considered sufficient merely to provide a means for holding the rim in the normal steering position, it is considered desirable for safety reasons that such means should be a locking means. When the rim is locked, the likelihood of an unintentional release is more remote.

Bolt 20 is slidingly supported within hub 10 by a sleeve 15 which permits bolt 20 to move back and forth between a retracted position substantially within hub 10 and an extended position (the position shown in FIG. 4) where it may protrude into rim recess 55 thereby engaging rim 50. In FIG. 4, bolt 20 is shown engaged with rim 50 (solid outline) when wheel 1 is in the steering impaired position. Such engagement serves to hold wheel 1 in the steering impaired position and, as is described below, may be a locked engagement.

Similarly, bolt 30 is slidingly supported within hub 10 by a sleeve 16 which permits bolt 30 to move back and forth between a retracted position substantially within hub 10 (the position shown in FIG. 4) and an extended position where it may protrude into spoke recess 95 thereby engaging inner end 91 of spoke 90. Such engagement serves to hold wheel 1 in the normal steering position and, as in the case of engagement between bolt 20 and rim 50, may be a locked engagement.

The movements of bolts 20 and 30 are controlled by the operation of lock cylinder 40 mounted in hub 10. Lock cylinder 40 is operable with a key (not shown) and, advantageously, may be compatible with a door or trunk key, or the ignition key, of the vehicle.

As best seen in FIGS. 4 and 5, bolt 20 is linked to cam 42 of cylinder 40 by means of link rods 21, 22 and lever member 23, the latter of which is pivotally held in hub 10 on a support post 24. Likewise, bolt 30 is linked to cam 42 by means of link rods 31, 32 and lever member 33, the latter of which is pivotally held in hub 10 on a support post 34. With such linkages, it will be understood that the movements of bolts 20 and 30 occur together and are controlled by a single operating mechanism. When a key (not shown) is inserted into lock cylinder 40 and the cylinder as shown in FIG. 4 is rotated clockwise, lever member 23 is pushed clockwise by rod 21. In turn, rod 22 pushes bolt 20 to the extended position shown in FIG. 4. Concurrently, lever member 33 is drawn anticlockwise by rod 31 and, in turn, rod 32 draws bolt 30 to the retracted position shown in FIG. 4. If cylinder 40 as shown in FIG. 4 is rotated anticlockwise, then the foregoing movements are reversed. Bolt 20 is drawn to a retracted position and bolt 30 is pushed to an extended position.

It will be readily apparent that the movements of bolts 20 and 30 could be controlled by independent operating mechanisms. However, a single operating mechanism which simultaneously controls both movements is considered preferable because it simplifies the use of the invention from a user's point of view.

When rim 50 is in the steering impaired position, it will be visibly evident to an intending thief that steerage has been impaired and will remain seriously impaired if the rim is broken away from the assembly. This appearance is designed to deter at least some potential thieves. Others, however, may assume that a strong push or pull on the rim which levers against the locking connection provided by bolt 20 might serve to break the connection and permit the rim to be rotated back to the normal steering position. In relation to the steering impaired position as shown in FIG. 5, a thief who held this belief would likely grip rim 50 in or around area 52 and violently pull back and forth endeavoring to break the locking means. However, this behaviour is addressed by making hinge 80 the weakest link in the assembly.

More particularly, and as shown in FIGS. 6 and 7, hinge 80 comprises a first part or hinge leaf 81 including three conventional hinge knuckles 82, and a second part or hinge leaf 83 including two split hinge knuckles each generally designated 84. When assembled, knuckles 84 interdigitate with knuckles 82 to form a hinge barrel within which hinge pin 85 is longitudinally received to pivotally connect the leaves 81, 83. So received, a nut or washer 86 is attached below the barrel to a lower protruding end of pin 85. Preferably, the nut or washer is attached fixedly by spot welding or other suitable means to prevent subsequent longitudinal removal of the pin. As best seen in FIG. 5, hinge leaf 81 is fixedly connected to outer end 72 of spoke portion 71. Similarly, hinge leaf 83 is fixedly connected with inner end 75 of spoke portion 74. Such connections should be made by welding or other suitable means which will not permit leaves 81, 83 to be easily disconnected.

Each split knuckle 84 is formed by a pair of arms 87a, 87b which normally extend partially around pin 85. As best seen in FIG. 7 which shows the diameter of pin 85 in broken outline 85a when the pin is in its normal position within a knuckle 84, the arms are structured to form a gap 88 which tapers inwardly in the direction laterally away from the pin (viz:. from right to left in FIG. 7). If leaf 83 is pulled or drawn in the opposed lateral direction while pin 85 is restrained in a fixed position by knuckles 82 of leaf 81, then arms 87a, 87b will be engaged in gap 88 by the longitudinal cylindrical surface of the pin. The normal forces which then develop between the engaging surfaces will tend to spread the arms. If a substantial lateral force is applied, then the arms will be spread by the pin 85—ultimately to the point where they will release from around the pin. Leaf 83 is then completely released from the remainder of hinge 80.

When leaf 83 is so released, it cannot be easily re-engaged. In this regard, it will be noted from FIG. 7 that the taper of gap 88 permits pin 85 to progressively ease into the gap from inside knuckle 84 when drawn into the gap by a lateral force. A substantial amount of lateral force resolves against the tapered surfaces and serves to spread arms 87a, 88b. Conversely, however, the taper having a smaller width at the outer perimeter of knuckle 84 serves to impede lateral re-entry of pin 85 because there will be a much less significant resolution of force tending to spread the arms.

Thus, a person who pulls back and forth on rim 50 with sufficient force in the manner described above (viz. while gripping rim area 52 when the rim is locked in the steering impaired position) will cause the connection between the hinge parts or leaves to be released. The release will occur as rim area 52 shown in FIG. 5 is pushed upwardly because rim 50, behaving like a lever anchored by lock bolt 20, will transmit a substantial amount of the pushing force spoke portion 74 as a tension force on hinge 80—thereby tending to draw leaf 83 away from leaf 81. When the release occurs, rim 50 together with spoke 90, spoke portion 74 and leaf 83 will be completely disengaged from the remainder of the steering wheel assembly. Since the separated parts of hinge 80 cannot be easily re-engaged, the rim is essentially unserviceable.

The actual amount of force required to separate the connection between leaves 81, 83 may be varied by varying the size and taper of gap 88 in relation to the diameter of pin 85 and, as well, will be a function of the strength and resilience of knuckle arms 87a, 87b. In order to ensure that the release operation occurs in the manner described above, the required release force should obviously not be so high that potentially damaging forces will be transmitted to other parts of the assembly when the release force is transmitted by rim 50 to the leaves of hinge 80.

The present invention may be embodied in other specific forms without departing from its spirit or essential characteristics, and the embodiment which has been described is to be considered in all respects only as illustrative and not as restrictive. Various changes and modifications are possible and will undoubtedly occur to those skilled in the art.

Accordingly, the scope of the invention is indicated by the appended claims rather than by the foregoing description. All changes or modifications which come within the meaning and range of equivalency of the claims are considered to be embraced within their scope.

I claim:

1. A steering wheel assembly for a vehicle, said assembly including:
   (a) a hub;
   (b) rim having a perimeter;
   (c) means for pivotally connecting said rim with said hub for rotation of said rim relative to said hub about an axis of rotation disposed inwardly from said rim, said rim being rotatable about said axis between a first position permitting normal steerage of said vehicle and a second position impairing normal steerage of said vehicle; and,
   (d) locking means operable when said rim is in said second position for releasably engaging and locking said rim in said second position at a point of engagement at or near said perimeter.

2. A steering wheel assembly as defined in claim 1, including holding means operable when said rim is in said first position for releasably holding said rim in said first position.

3. A steering wheel assembly as defined in claim 1, wherein said locking means comprises:
   (a) a locking member carried by said hub; and,
   (b) means for moving said locking member between a retracted position substantially within said hub and an extended position lockably engaging said rim when said rim is in said second position.

4. A steering wheel assembly as defined in claim 1, wherein said connecting means comprises a spoke having:
   (a) a first portion extending from an inner end connected to said hub to an outer end;
   (b) a second portion extending from an outer end connected to said rim to an inner end;

(c) a hinge pivotally interconnecting said inner end of said second portion with said outer end of said first portion, said hinge permitting said rotation of said rim.

5. A steering wheel assembly as defined in claim 4, including means for disabling said rotation of said rim from said first position to said second position.

6. A steering wheel assembly as defined in claim 2, wherein said connecting means further comprises at least one additional spoke, said additional spoke including an outer end connected to said rim and an inner end, said hub including means for releasably engaging said inner end of said additional spoke when said rim is in said first position.

7. A steering wheel assembly as defined in claim 6, wherein said means for releasably engaging said inner end of said additional spoke comprises:

(a) a holding member carried by said hub; and, (b) means for moving said holding member between a retracted position substantially within said hub and an extended position holdingly engaging said inner end of said additional spoke when said rim is in said first position.

8. A steering wheel assembly as defined in claim 7, wherein said locking means comprises:

(a) a locking member carried by said hub; and, (b) means for moving said locking member between a retracted position substantially within said hub and an extended position lockably engaging said rim when said rim is in said second position.

9. A steering wheel assembly as defined in claim 4, including a locking means operable when said rim is in said first position for releasably locking said rim in said first position.

10. A steering wheel assembly as defined in claim 9, wherein said connecting means comprises at least one additional spoke, said additional spoke including an outer end connected to said rim and an inner end, said locking means comprising:

(a) first and second locking members carried by said hub; and, (b) lock control means for moving each of said locking members between an associated retracted position substantially within said hub and an associated extended position, said first locking member extending to lockably engage said rim when said rim is in said second position, said second locking member extending to lockably engage said inner end of said additional spoke when said rim is in said first position.

11. A steering wheel assembly as defined in claim 10, wherein said lock control means comprises:

(a) a lock cylinder carried by said hub and operable with a key for rotation about a cylinder axis;

(b) first linking means connecting said cylinder to said first locking member for moving said first locking member between its said retracted and said extended positions in response to said rotation of said cylinder; and, (c) second linking means connecting said cylinder to said second locking member for moving said second locking member between its said retracted and said extended positions in response to said rotation of said cylinder.

12. A steering wheel assembly as defined in claim 11, wherein said first and second locking members are linked to said cylinder by their associated first and second linking means such that:

(a) said second locking member moves to its extended position when said first locking member is moved to its retracted position; and, (b) said second locking member moves to its retracted position when said first locking member is moved to its extended position.

13. A steering wheel assembly as defined in claim 9, wherein said hinge comprises:

(a) a first part fixedly connected to said outer end of said first portion;

(b) a second part fixedly connected to said inner end of said second portion; and, (c) connection means for connecting said second part to said first part and for permitting pivotal movement therebetween, said connection means including means for releasing said connection between said parts in response to a substantial force applied to said rim endeavouring to break said locking means while said rim is locked in said second position.

14. A steering wheel assembly as defined in claim 9, wherein said hinge comprises:

(a) a first hinge leaf fixedly connected to said outer end of said first portion, said first hinge leaf including at least one hinge knuckle;

(b) a second hinge leaf fixedly connected to said inner end of said second portion, said second hinge leaf including at least one hinge knuckle;

(c) a hinge pin longitudinally received within a hinge barrel formed by said hinge knuckles to connect said leaves, said pin permitting pivotal movement of said second leaf relative to said first leaf; and, (d) said at least one hinge knuckle of said second leaf being formed by a pair of arms each normally extending partially around said pin, said arms being spreadable by said pin to release from around said pin in response to a substantial force applied to said rim endeavouring to break said locking means while said rim is locked in said second position.

* * * * *